United States Patent
Wang et al.

(10) Patent No.: US 8,595,964 B2
(45) Date of Patent: Dec. 3, 2013

(54) SURFACE BEARING PATTERNED INDICIA HAVING MICRO-STRUCTURES AND METHOD OF MAKING THE SAME

(75) Inventors: Kong-Hua Wang, Dasi Town (TW); Abbas Hosseini, Santa Clara, CA (US); Daniel Y. C. Ko, Dasi Town, CA (US)

(73) Assignee: Ubright Optronics Corporation, Dasi Town (TW)

( * ) Notice: Subject to any disclaimer, the term of this patent is extended or adjusted under 35 U.S.C. 154(b) by 166 days.

(21) Appl. No.: 12/832,021

(22) Filed: Jul. 7, 2010

(65) Prior Publication Data

US 2011/0000110 A1 Jan. 6, 2011

Related U.S. Application Data

(63) Continuation-in-part of application No. 12/590,855, filed on Nov. 12, 2009, which is a continuation of application No. 11/450,145, filed on Jun. 9, 2006, now Pat. No. 7,618,164.

(60) Provisional application No. 61/223,388, filed on Jul. 7, 2009.

(51) Int. Cl.
*G09F 19/14* (2006.01)

(52) U.S. Cl.
USPC .............................................. 40/453; 283/91

(58) Field of Classification Search
USPC ............................................ 359/625; 40/453
See application file for complete search history.

(56) References Cited

U.S. PATENT DOCUMENTS

| 4,033,059 A * | 7/1977 | Hutton et al. | 283/91 |
| 4,124,947 A * | 11/1978 | Kuhl et al. | 283/91 |
| 5,428,479 A | 6/1995 | Lee | |
| 5,591,527 A * | 1/1997 | Lu | 428/411.1 |
| 2001/0043396 A1 * | 11/2001 | Lee | 359/569 |
| 2007/0246932 A1 * | 10/2007 | Heine et al. | 283/94 |
| 2008/0309063 A1 * | 12/2008 | Zintzmeyer | 283/72 |
| 2009/0121473 A1 * | 5/2009 | Camus et al. | 283/85 |

FOREIGN PATENT DOCUMENTS

| WO | 98/23979 | 6/1998 |
| WO | 99/17941 | 4/1999 |
| WO | 03/009225 | 1/2003 |
| WO | 2006/095161 | 9/2006 |
| WO | WO 2007020048 A2 * | 2/2007 |
| WO | 2009/013000 | 1/2009 |

OTHER PUBLICATIONS

International Search Report of Counterpart PCT App. No. PCT/US2010/041253.

* cited by examiner

*Primary Examiner* — Kristina Junge
(74) *Attorney, Agent, or Firm* — Liu & Liu (57) ABSTRACT

An article having a surface bearing patterned indicia having micro-structures. A surface is provided with contrasting micro-structured features that form perceptible indicia or pattern having a recognizable pattern in reference to a background surface. The background surface is a micro-structured surface, on which perceptible indicia having the recognizable pattern of micro-structures are formed. The pattern of micro-structured features includes raised and/or recessed structures with respect to the substrate surface. The micro-structured surface includes irregular prisms forming structural features or topography within a plane of longitudinal rows of regular prisms. The indicia in reference to the background plane are perceivable, without requiring contrasting colors between the indicia and the background.

20 Claims, 12 Drawing Sheets

SURFACE BEARING PATTERNED INDICIA HAVING MICRO-STRUCTURES AND METHOD OF MAKING THE SAME

CROSS-REFERENCE TO RELATED APPLICATION

This application claims priority of U.S. Provisional Application Ser. No. 61/223,388 filed on Jul. 7, 2009, and is a continuation-in-part of U.S. application Ser. No. 12/590,855 filed on Nov. 12, 2009, which is a continuation of U.S. application Ser. No. 11/450,145, filed Jun. 9, 2006, now U.S. Pat. No. 7,618,164. All publications noted in the present application are incorporated by reference herein as if fully set forth herein.

BACKGROUND

1. Field of Invention

This invention relates to a film bearing indicia, and in particular a film bearing 3-D indicia.

2. Description of Related Art

In connection with marketing, distribution and sale of products, it is very common to provide unique indicia that are printed on or adhered onto the products or their packaging. Typically, the indicia could represent logos, trademarks, etc. The indicia may be in the form of patterned images, symbols and/or characters representative of the products and their sources. Such indicia provide an effective means for consumers to distinguish between the sources of similar products in the market.

Further, to curb product counterfeiting, tamper-proof indicia have been applied to distinguish genuine or authentic products from counterfeited products. This is particularly helpful to the consumers who might not be able to effectively identify counterfeit products from genuine products without authentication indicia.

Heretofore, printing is a traditional method used to form 2-D indicia or images on various media of different materials (e.g., paper, plastics, metal, fabric, or other materials). Printing involves application of color pigments onto the surface of a substrate of a particular material. However, given the ease of printing and the wide availability of printing facilities, printed indicia can be easily duplicated or reproduced. Hence, authentication indicia can be easily duplicated by counterfeiters. Given the ease and availability of high quality printing, authentication indicia can be easily counterfeited, to render it difficult for unwary consumers to be able to effectively determine the authenticity of the authenticating indicia. Accordingly, printed indicia are not generally relied upon exclusively for product authentication. Typically, printed authentication indicia include additional features and attributes to render it more difficult for counterfeiters to duplicate such authentication indicia. This may involve special color pigments, combination of pigments, image details, embossing, material, etc.

For authenticating important and/or valuation articles (e.g., currency notes, checks, travel documents, credit cards, identification cards, etc.), higher standards of authentication indicia are required. In addition to such authentication indicia being able to display a unique image, such authentication indicia must not be easily duplicated, reproduced, copied, or otherwise counterfeited, so as to achieve a desired level of "tamper-proofing" or "anti-counterfeiting".

Heretofore, holography has been applied to form authentication indicia, for example in the form of authentication seals applied to genuine product packaging and authentication labels on credit cards. Holography utilizes microstructures that provide a distinctive image that appears to be "dynamic", with changing appearance depending on the view angle, which may change in color appearance and/or 3D appearance of the associated images. Therefore, holographic indicia are not as easily duplicated or counterfeited compared to printed indicia, thus providing a more reliable means to associate genuine products and articles.

While holograms were effective in identifying genuine products and articles, with technological advancement, it has become less of a challenge for counterfeiters to duplicate the holographic authentication indicia. Further, holograms are relatively expensive to reproduce for illegitimate use. There remains a need for more cost effective authentication indicia that are not easily duplicated.

SUMMARY OF THE INVENTION

The present invention overcomes the shortcomings of prior art, by providing an article having a surface bearing patterned indicia having micro-structures. According to the present invention, a surface is provided with contrasting micro-structured features with dimensions from tens of micrometers to hundreds of nanometers that form perceptible indicia or pattern having a recognizable pattern in reference to the background surface. The background surface may be a surface of a substrate (e.g., a film, plate, sheet, etc.) of appropriate material (e.g., plastic, metal, etc.) on which the perceptible indicia having a recognizable pattern of micro-structures are formed. The substrate may be partially or entirely transparent, opaque, reflective, and/or translucent. The background surface may be a micro-structured surface, a substantially smooth surface, a matte surface, a textured surface, etc., which have a uniform or orderly appearance (which may include a random distribution of surface features (i.e., at white noise randomness level) that provides a uniform appearance), against which the pattern of micro-structures would be contrasting, distinguishable, discernable, and recognizable. The micro-structured features of the perceivable indicia (as represented by the recognizable pattern of micro-structured features) are sized and/or distributed to be perceivable to a viewer, either with naked eyes or with the help of a magnifying glass. The indicia in reference to the background plane are perceivable without requiring contrasting colors between the indicia and the background. The pattern of micro-structured features may include raised and/or recessed structures with respect to the substrate surface. The characteristic dimension of micro-structures is on the order from tens of micrometers to hundreds of nanometers.

In accordance with one aspect of the present invention, the background surface includes a first prismatic structure disposed on one surface of a substrate, which have a uniform or orderly appearance. The contrast of the indicia to the background prismatic structures may be achieved by a difference in size, height, geometry, density, distribution, optical characteristics (e.g., optical clarity, transparency, translucency, reflectivity, opacity diffraction) of the micro-structures in the indicia against the background prismatic structures.

In one embodiment, the micro-structure on the background surface has a constant sectional profile (e.g., a uniform cylindrical structure in the longitudinal direction). In the illustrated embodiment, the micro-structure comprises prismatic structure that includes a plurality of regular prisms arranged in longitudinal rows. The longitudinal rows of prisms are arranged side by side in a lateral direction, defining valleys between two adjacent longitudinal rows of prisms. The indicia are formed by patterned micro-structural features or topography within the plane of the longitudinal rows of regular prisms. The pattern of micro-structural features may include raised and/or recessed structures with respect to the surfaces of the longitudinal rows of prisms, which may further include structures with increasing/decreasing heights, meandering or snaking structures, shifting structures, step structures, structures with progressively increasing/decreasing heights, structural voids, etc.

In an alternate embodiment, the background prismatic structure includes a random distribution of irregular prisms with random structures (i.e., at white noise randomness level), and indicia represented by patterned micro-structural features or topography that are contrasted and recognizable against the plane of the irregular prisms.

In one embodiment, the indicia are formed by patterned prismatic structures disposed on longitudinal rows of regular prisms. The pattern of prismatic features may include raised or recessed prismatic structures with respect to the surfaces of the longitudinal rows of prisms. With the orderly longitudinal rows of regular prisms as the background, the pattern of prismatic features forms a recognizable pattern or indicia.

The patterned prismatic structures may comprise irregular prisms forming structural features or topography within the plane of longitudinal rows of regular prisms. With the orderly longitudinal rows of regular prisms as the background, the irregular prisms form a recognizable pattern or indicia.

In another embodiment, a second prismatic structure is disposed on the other surface of the substrate. A second pattern of micro-structures forming indicia may be provided within the plane of the background of the second prismatic structure.

In a further embodiment, the perceivable indicia are formed by a combination of the first and second patterns of micro-structures on both sides of a transparent substrate.

The article having the recognizable indicia or pattern of micro-structure features within the plane of the background surface may be adaptable for use in many fields. For example, it could be applied in the form of trademarks and logos, in particular, for use as authentication or anti-counterfeiting labels and seals, which would be difficult for counterfeiters to duplicate or tamper with. In addition, the article is applicable in the security field, for authentication, identification, or tamper resistance seals.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAIL DESCRIPTION OF THE ILLUSTRATED EMBODIMENTS

The present description is of the best presently contemplated mode of carrying out the invention. This invention has been described herein in reference to various embodiments and drawings. This description is made for the purpose of illustrating the general principles of the invention and should not be taken in a limiting sense. It will be appreciated by those skilled in the art that variations and improvements may be accomplished in view of these teachings without deviating from the scope and spirit of the invention. The scope of the invention is best determined by referenced to the appended claims.

The present invention is directed to an article having a surface bearing patterned indicia having micro-structures. According to the present invention, a surface is provided with contrasting micro-structured features that form perceptible indicia or pattern having a recognizable pattern in reference to the background surface. The background surface may be a surface of a substrate (e.g., a film, plate, sheet, etc.) of appropriate material (e.g., plastic, metal, etc.) on which the perceptible indicia having a recognizable pattern of micro-structures are formed. The substrate may be partially or entirely transparent, opaque, reflective, and/or translucent. The background surface may be a micro-structured surface, a substantially smooth surface, a matte surface, a textured surface, etc., which have a uniform or orderly appearance (which may include a random distribution of surface features (i.e., at white noise randomness level) that provides a uniform appearance), against which the pattern of micro-structures would be contrasting, distinguishable, discernable, and recognizable. The micro-structured features of the perceivable indicia (as represented by the recognizable pattern of micro-structured features) are sized and/or distributed to be perceivable to a viewer, either with naked eyes or with the help of a magnifying glass. The indicia in reference to the background plane are perceivable without requiring contrasting colors between the indicia and the background. The pattern of micro-structured features may include raised and/or recessed structures with respect to the substrate surface. The characteristic dimension of micro-structures is on the order from tens of micrometers to hundreds of nanometers.

The article having the recognizable indicia or pattern of micro-structure features within the plane of the background surface may be adaptable for use in many fields. For example, it could be applied in the form of trademarks and logos, in particular, for use as authentication or anti-counterfeiting labels and seals, which would be difficult for counterfeiters to duplicate or tamper with. In addition, the article is applicable in the security field, for authentication, identification, or tamper resistance seals.

The present invention will be further described below in connection with the illustrated embodiments.

Figure 1:
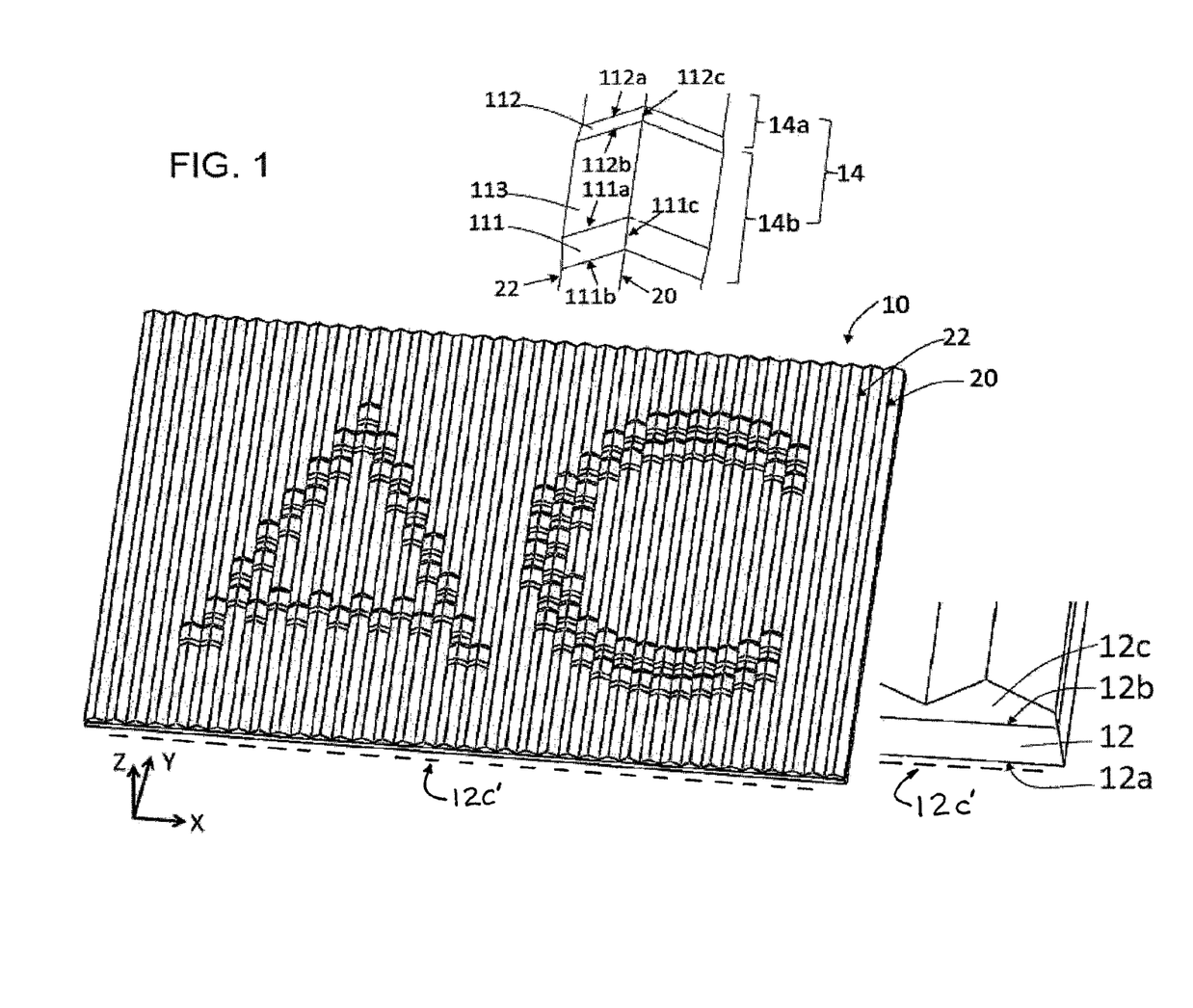
FIG. 1 is a schematic perspective view of an article having a surface provided with micro-structured indicia in accordance with one embodiment of the present invention.
Figure 2:
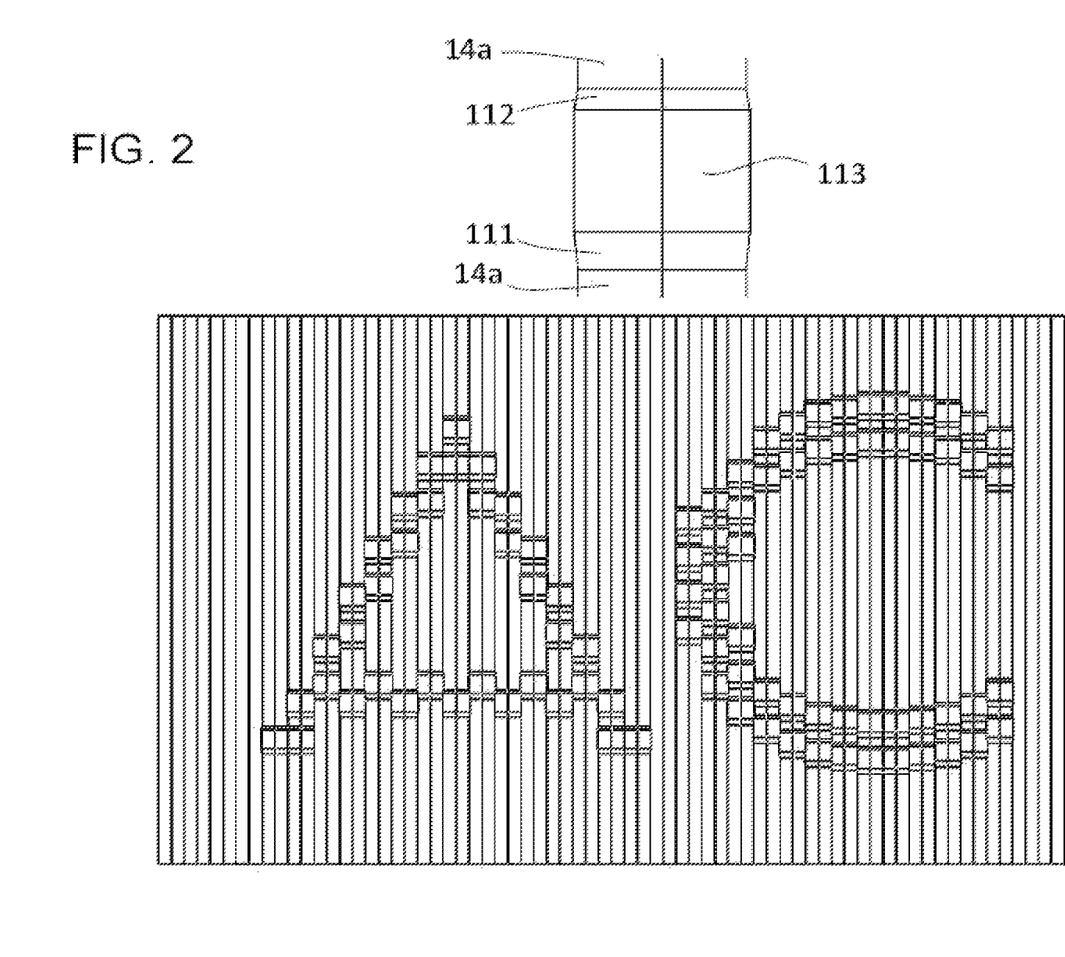
FIG. 2 is a top plan view of the article in FIG. 1.

FIG. 1 is a schematic diagram of an article having a surface provided with micro-structured indicia in accordance with one embodiment of the present invention. FIG. 2 is a top plan view of the article in FIG. 1. In accordance with the present invention, an article 10 comprises a substrate 12, which has a structured surface 14 and a substantial planar surface 12a. The substrate 12 is made of a thin, flexible polymeric film, sheet or plate, which may comprise a material including but not limited to polyester, such as polyethylene terephthalate;

polyamide; polycarbonate; poly(vinylchloride); poly(vinylidenechloride); cellulose acetate butyrate; cellulose acetate propionate; poly(ether sulfone), poly(methylmethacrylate), polyurethane, and the like. In other embodiment, the substrate 12 can be made of a thin, flexible metal film, sheet or plate, which may comprise a material including but not limited to silver (Ag), gold (Au), copper (Cu), nickel (Ni), and the like.

In the illustrated embodiment, the substrate 12 comprises two separate layers, wherein the top layer 12c has the structured surface 14, and the bottom base layer 12b has the planar surface 12a. The two layers are adhered together to form the substrate 12. It can be appreciated that the substrate may be formed from a single integrated layer of material, instead of two separate physical layers, without departing from the scope and spirit of the present invention. In the illustrated embodiment, the structured layer 12c and the base layer 12b are made of different materials. The structured surface layer 12c may be formed using polymerizable resin, such an ultraviolet or visible radiation-curable resin. Generally, the structured surface 14 is formed by applying a coatable composition comprising polymerizable and crosslinkable resin onto a master mold or master drum and a hardening process. The base layer 12b may be made of a polymer, fabric, paper, metal, etc.

Either or both base layer 12b and structured layer 12c may be partially or wholly transparent, translucent, opaque, or reflective. For example, the base layer 12b may be made of a reflective metal, and the structured layer 12c made of a transparent polymer, so that light may be transmitted through the transparent polymer layer, to be reflected by the reflective base layer. The indicia would appear to have a different optical effect since the reflected light travels through a thinner or thicker layer, and/or regions of different refractive effect through the polymer layer (as will be more apparent from the discussions below). Both base layer 12b and structured layer 12c may be made of transparent material, or reflective material. Alternatively, the structured layer 12c may be made reflective by coating with a reflective material, such as a reflective metal coating by a chemical vapor deposit process.

The base layer 12b may be the base layer of a small label or seal, which may be applied (e.g., by adhesive) to an object to be protected by the article 10 as an authentication or anti-counterfeit label or seal. The base layer 12b may also be part of a larger object, such as the surface of a DVD (digital video disc), credit card, identification card, etc., to which the structured layer 12c can be formed to provide authentication or anti-counterfeit identification to said object. In this embodiment, the surface of the object becomes part of the article 10 described herein.

In accordance with one aspect of the present invention, the background surface includes a first prismatic structure disposed on one surface of a substrate, which have a uniform or orderly appearance. The contrast of the indicia to the background prismatic structures may be achieved by a difference in size, height, geometry, density, distribution, optical characteristics (e.g., optical clarity, transparency, translucency, reflectivity, opacity diffraction) of the micro-structures in the indicia against the background prismatic structures.

In one embodiment, the micro-structures on the background surface have a constant sectional profile (e.g., a uniform cylindrical structure in the longitudinal direction). In the illustrated embodiment, the micro-structures are prismatic structure that includes a plurality of regular prisms arranged in longitudinal rows. The longitudinal rows of prisms are arranged side by side in a lateral direction, defining valleys between two adjacent longitudinal rows of prisms. The regular prisms each extends between opposite edges of the substrate 12.

The indicia are formed by patterned micro-structural features or topography within the plane of the longitudinal rows of regular prisms. The pattern of micro-structural features may include raised and/or recessed structures with respect to the surfaces of the longitudinal rows of prisms, which may further include structures with increasing/decreasing heights, meandering or snaking structures, shifting structures, step structures, structures with progressively increasing/decreasing heights, structural voids, etc.

In one embodiment, the indicia are formed by patterned prismatic structures disposed on longitudinal rows of regular prisms. The pattern of prismatic features may include raised or recessed prismatic structures with respect to the surfaces of the longitudinal rows of prisms. With the orderly longitudinal rows of regular prisms as the background, the pattern of prismatic features forms a recognizable pattern or indicia.

The patterned prismatic structures may comprise irregular prisms forming structural features or topography within the plane of longitudinal rows of regular prisms. With the orderly longitudinal rows of regular prisms as the background, the irregular prisms form a recognizable pattern or indicia.

Referring again to the illustrated embodiment in FIG. 1, the structured surface 14 includes prismatic structures that comprise a plurality of regular prisms 14a and irregular prisms 14b. In general, the regular prisms 14a comprise generally straight blocks of prisms that serve as the background, and the irregular prisms 14b serve as relief patterns for representing the indicia to contrast or distinguish from the background. The regular prisms 14a are arranged in substantially longitudinal rows, with each longitudinal row of prism arranged side by side in parallel, defining valleys 22 between adjacent peaks 20 of adjacent longitudinal rows of prisms. In the illustrated embodiment, the regular prism 14a has a sectional profile (i.e., in the X-Z plane) of an isosceles triangle, with a right-angled vertex angle (i.e., the included angle of the peak 20). In this embodiment, the regular prisms 14a are substantially right angled isosceles prisms arranged side-by-side in parallel relationship to form a plurality of peaks 20 and valleys 22. The substantially planar facets of the prisms in this embodiment preferably make an angle of approximately 45° with base surface 12a.

Referring to FIG. 1, the indicia (i.e., "A C") is represented by varying prismatic structure 14, comprising varying irregular prisms 14b on a background of regular prisms 14a. Regular prisms 14a include generally longitudinally prism bodies with a constant prism height. In the embodiment illustrated in FIGS. 1 and 2, the irregular prisms 14b are raised structures with respect to the surfaces of the regular prisms 14a. In other words, the irregular prisms 14b are protrusions from the surfaces of the regular prisms 14a.

Irregular prisms 14b include two tapering bodies 111 and 112 in this embodiment. A regular section of prism 113 extend between the two tapering bodies 111 and 112. Tapering body 111 has a first end 111a, a second end 111b and a ridge 111c extending from the first end 111a to the second end 111b. The ridge 111c between two ends has peak heights different from the peak height of the regular prisms 14a. Likewise, tapering bodies 112 has a first end 112a, a second end 112b and a ridge 112c extending from the first end 112a to the second end 112b. The ridge 112c between two ends has peak heights different from the peak height of the regular prisms 14a and 113. In this embodiment, the peak heights along the ridges 111c and 112c are higher than the peak height of the regular prism 14a, but lower than the peak heights of the regular prisms 113. In other words, along the regular prisms 14a, the irregular prisms 14b are protruding out from the regular prisms 14a. From another perspective, it can be characterized that the regular prisms protrude at section 113 along the regular prisms 14a, with transitions represented by tapering bodies 111 and 112. In the illustrated embodiment, the irregular prisms 14b are symmetrical in the y-direction in the x-y plane.

Further discussions of irregular prisms and tapering bodies may be referenced to U.S. Pat. No. 7,618,164, which had been incorporated by reference herein.

Figure 1A:
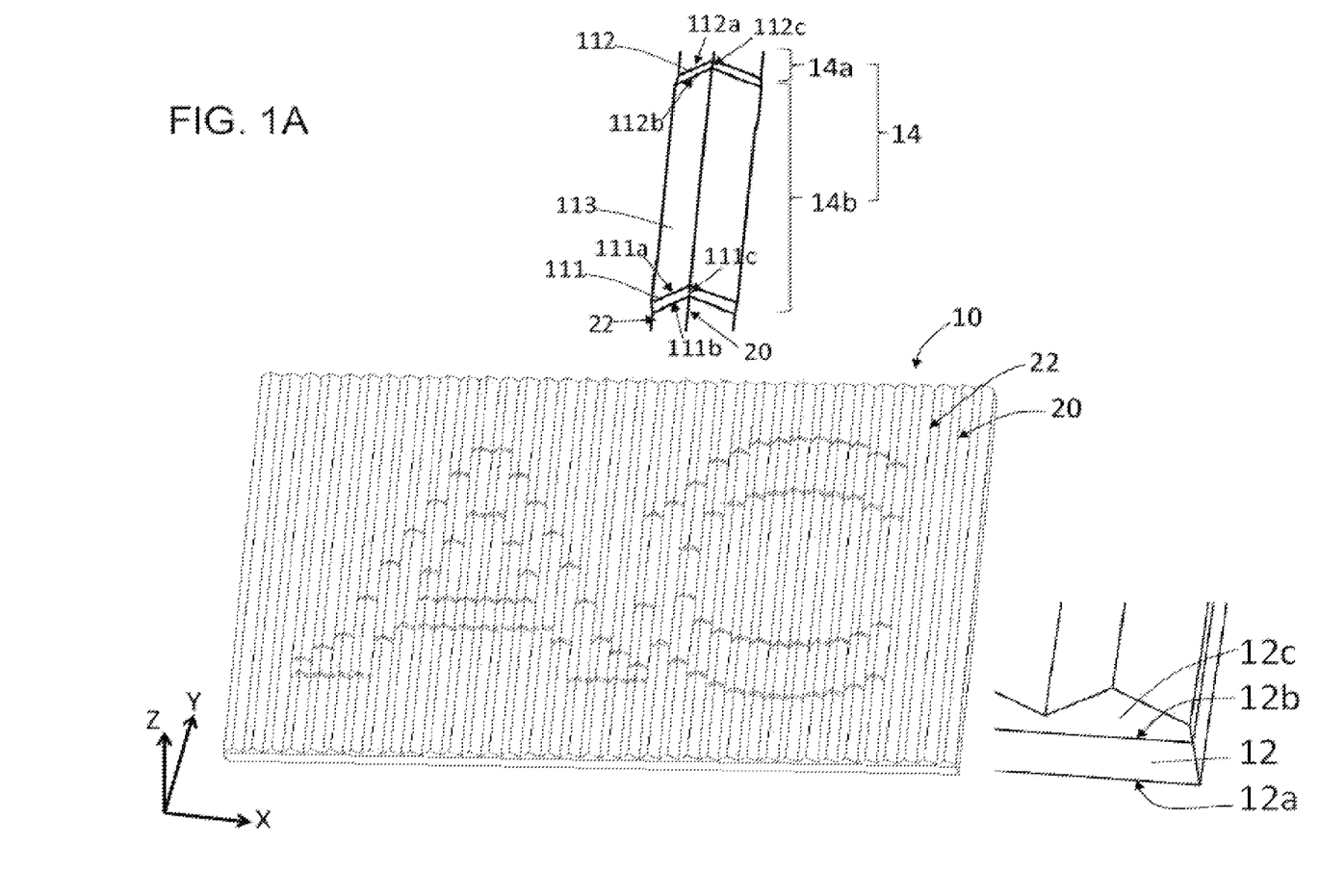
FIG. 1A is a schematic perspective view of an article having a surface provided with micro-structured indicia in accordance with another embodiment of the present invention.

The irregular prisms 14b may be predefined in size, shape and locations so as to represent the desired indicia (e.g., images, characters, logos and/or symbols). In the illustrated embodiment, the segments in the alphabets "A C" are represented by two short protruded prisms (i.e., two shorter prism sections 113). Referring to FIG. 1A illustrates an alternate embodiment in which the segments are represented by a single longer protruded prism section 113. At the same time, the regular prisms 14a may play the role of redirecting and collimating light for carrying the irregular prisms 14b representing the indicia. Viewed by naked eyes or with the aid of a magnifying glass, the regular prisms 14a appear as a uniform background while the irregular prisms 14b represent the desired patterned indicia in reference to the background. Moreover, a person may see different representations of the indicia at different viewing angles.

The size or the pitch of the regular prisms 14a and the irregular prisms 14b are not particularly restricted. The pitch of adjacent rows is preferably within the range of 0.1 to 200 micrometers, more preferably within 0.2 to 100 micrometers. In another embodiment, the irregular prism 14b may include more than two tapering bodies.

The characteristic dimensions of the micro-structures (in both the indicia and the background) are on the order of tens of microns to a hundred of nanometer for the peak heights and several millimeters to a hundred of nanometer for the peak-to-peak or valley-to-valley pitch. The thickness of the base layer of the substrate is on the order of several microns to several millimeters.

The regular prisms 14a may be modified and not be limited to have a sectional profile (X-Z plane) that is right-angled isosceles triangular only. In alternate embodiments, the regular prism 14a may have instead a x-z plane sectional profile of a rounded peak or a flat top (i.e., a sectional trapezoidal profile). In still another embodiment, the regular prism 14a may have a peak that is generally sinusoidal curved or in a wavy form in the x-y plane of the structured surface or in a lateral x-direction, with the peak angle remaining the same along the peak. The regular prism could also be closer to a cylindrical lenticular form, having less defined flat facets defining peaks and valleys.

The base surface 12a of the substrate 12 may be substantially smooth, matte or frosted finish. A second pattern of micro-structures forming perceivable indicia may be provided within the plane of the base surface 12 (schematically represented by dotted line 12c', which may take similar structures in the above-described embodiments). In a further embodiment, perceivable indicia are formed by a combination of the first and second patterns of micro-structures on both sides of a transparent base substrate. In a still further embodiment, a second prismatic structure (schematically represented by dotted line 12c', which may take similar structures in the above-described embodiments) is disposed on the base surface 12a of the substrate 12 to provide a background for the indicia on the side of the base surface 12a.

Figure 3:
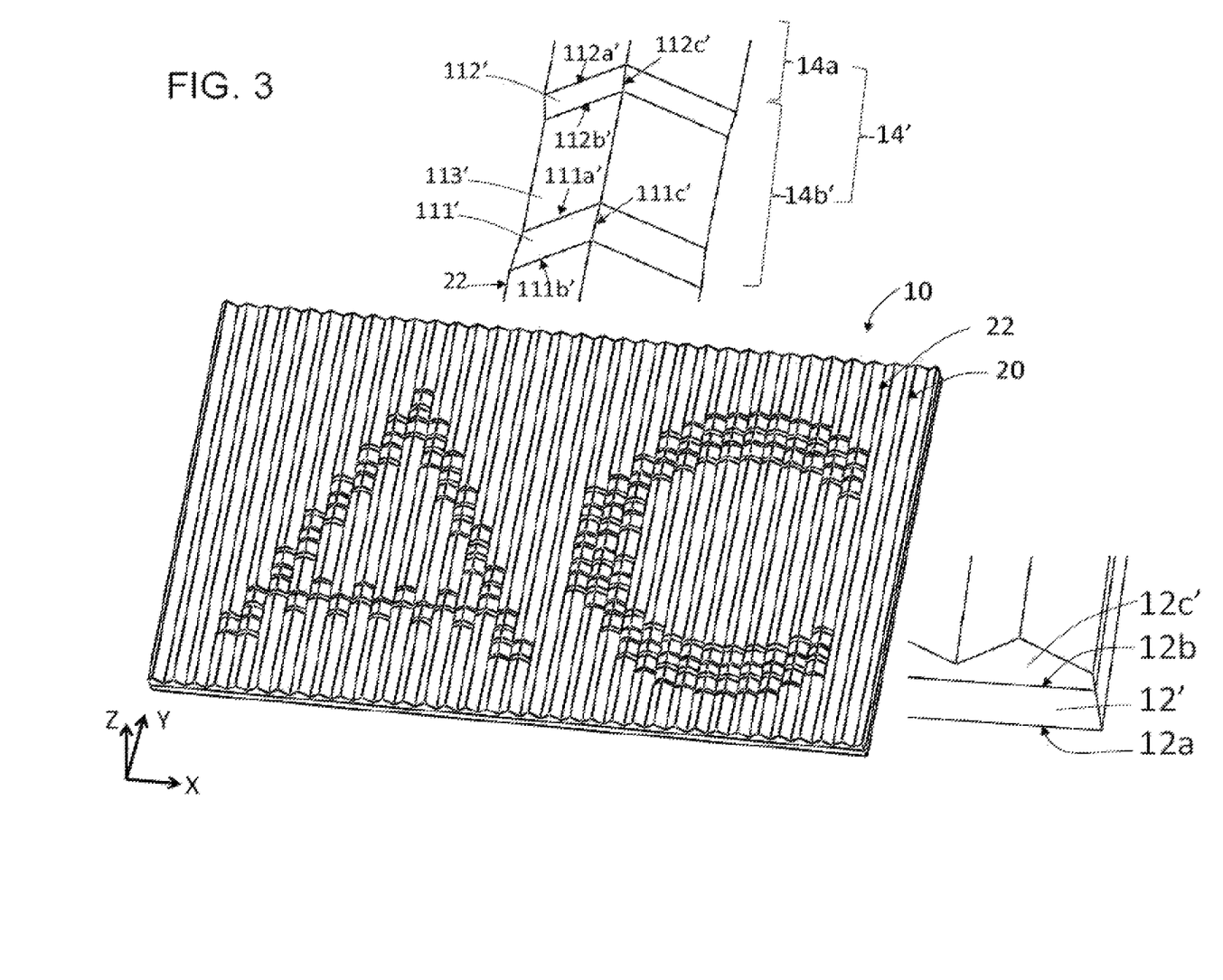
FIG. 3 is a schematic perspective view of an article having a surface provided with micro-structured indicia in accordance with another embodiment of the present invention.
Figure 4:
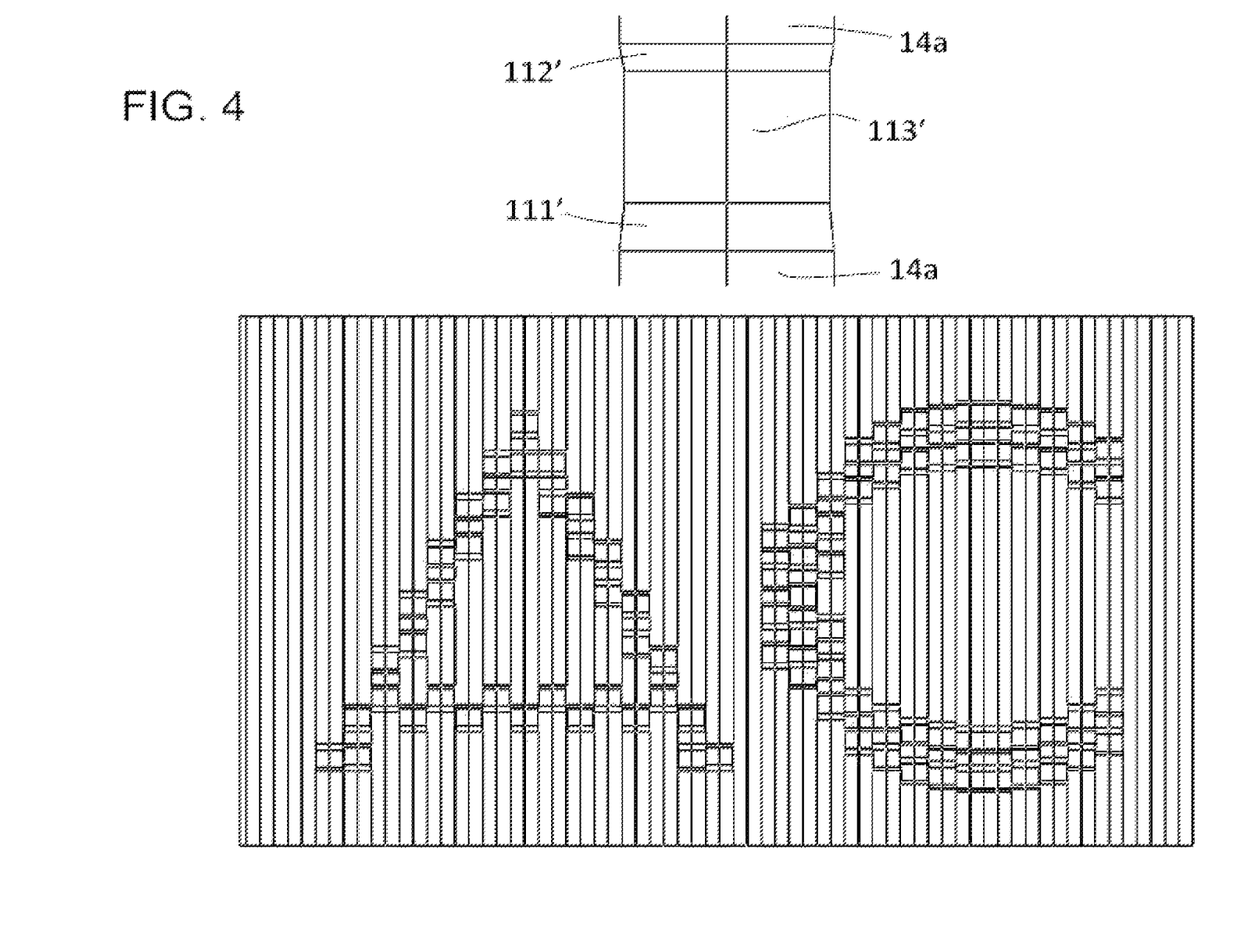
FIG. 4 is a top plan view of the article in FIG. 3.

FIGS. 3 and 4 illustrate another embodiment of the present invention. In the embodiment illustrated in FIGS. 3 and 4, the irregular prisms 14b' are recessed structures with respect to the surfaces of the regular prisms 14a of the structured surface 14' of the substrate 12'.

Irregular prisms 14b' include two tapering bodies 111' and 112' in this embodiment. A regular section of prism 113' extends between the two tapering bodies 111' and 112'. Tapering body 111' has a first end 111a', a second end 111b' and a ridge 111c' extending from the first end 111a' to the second end 111b'. The ridge 111c' between two ends has peak heights different from the peak height of the regular prisms 14a. Likewise, tapering bodies 112' has a first end 112a', a second end 112b' and a ridge 112c' extending from the first end 112a' to the second end 112b'. The ridge 112c' between two ends has peak heights different from the peak height of the regular prisms 14a and 113'. In this embodiment, the peak heights along the ridges 111c' and 112c' are lower than the peak height of the regular prism 14a, but higher than the peak height of the regular prism 113'. In other words, along a regular prism 14a, the irregular prism 14b' is recessed from the regular prism 14a. From another perspective, it can be characterized that the regular prisms is recessed at section 113' along the regular prisms 14a, with transitions represented by tapering bodies 111' and 112'. In the illustrated embodiment, the irregular prisms 14b' are symmetrical in the y-direction in the x-y plane.

In another embodiment, indicia may be represented by a combination of the afore-described raised irregular prisms 14b and recessed irregular prisms 14b' on a contrasting background of regular prisms 14a, without departing from the scope and spirit of the present invention.

Figure 5:
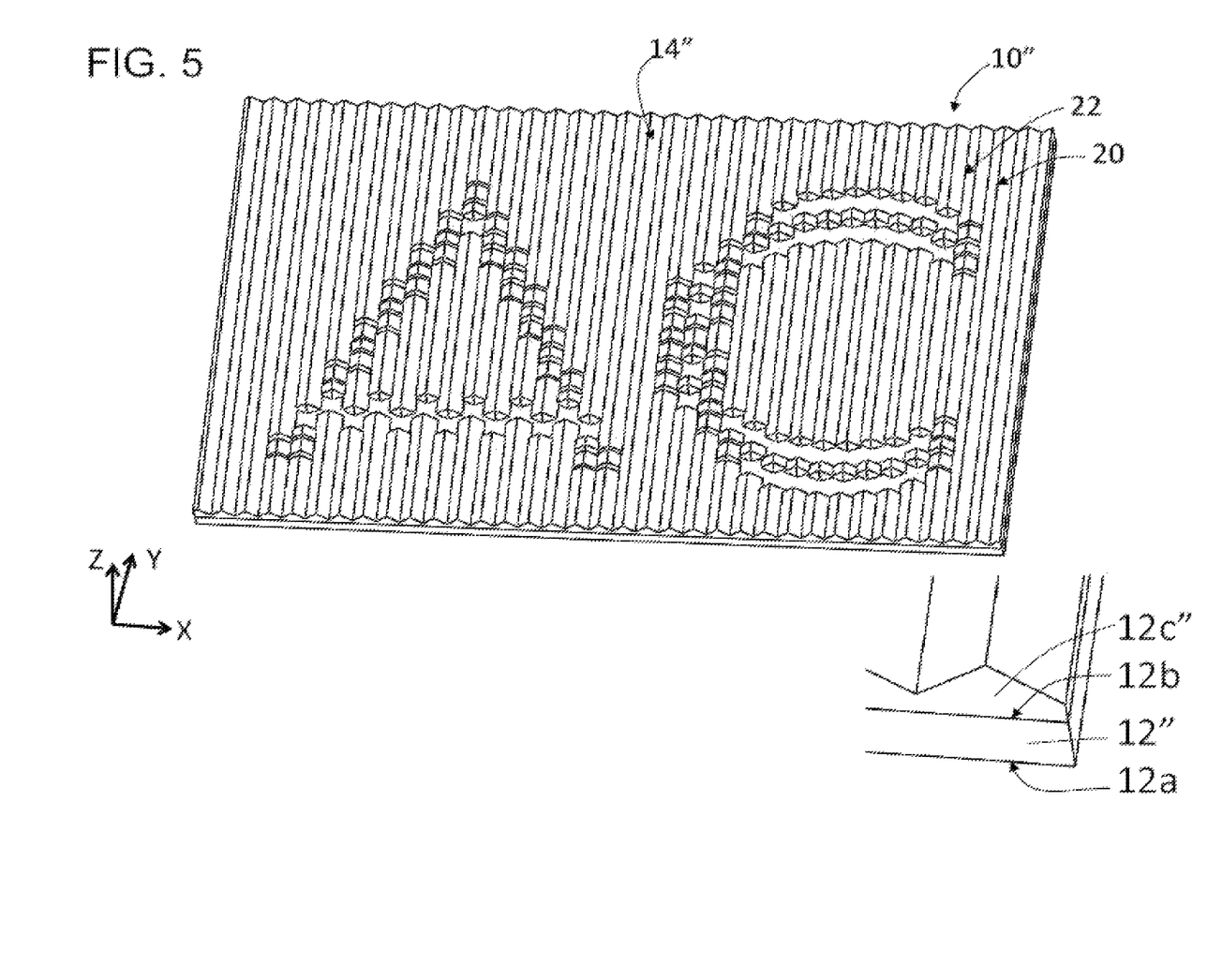
FIG. 5 is a schematic perspective view of an article having a surface provided with micro-structured indicia in accordance with a further embodiment of the present invention.
Figure 6:
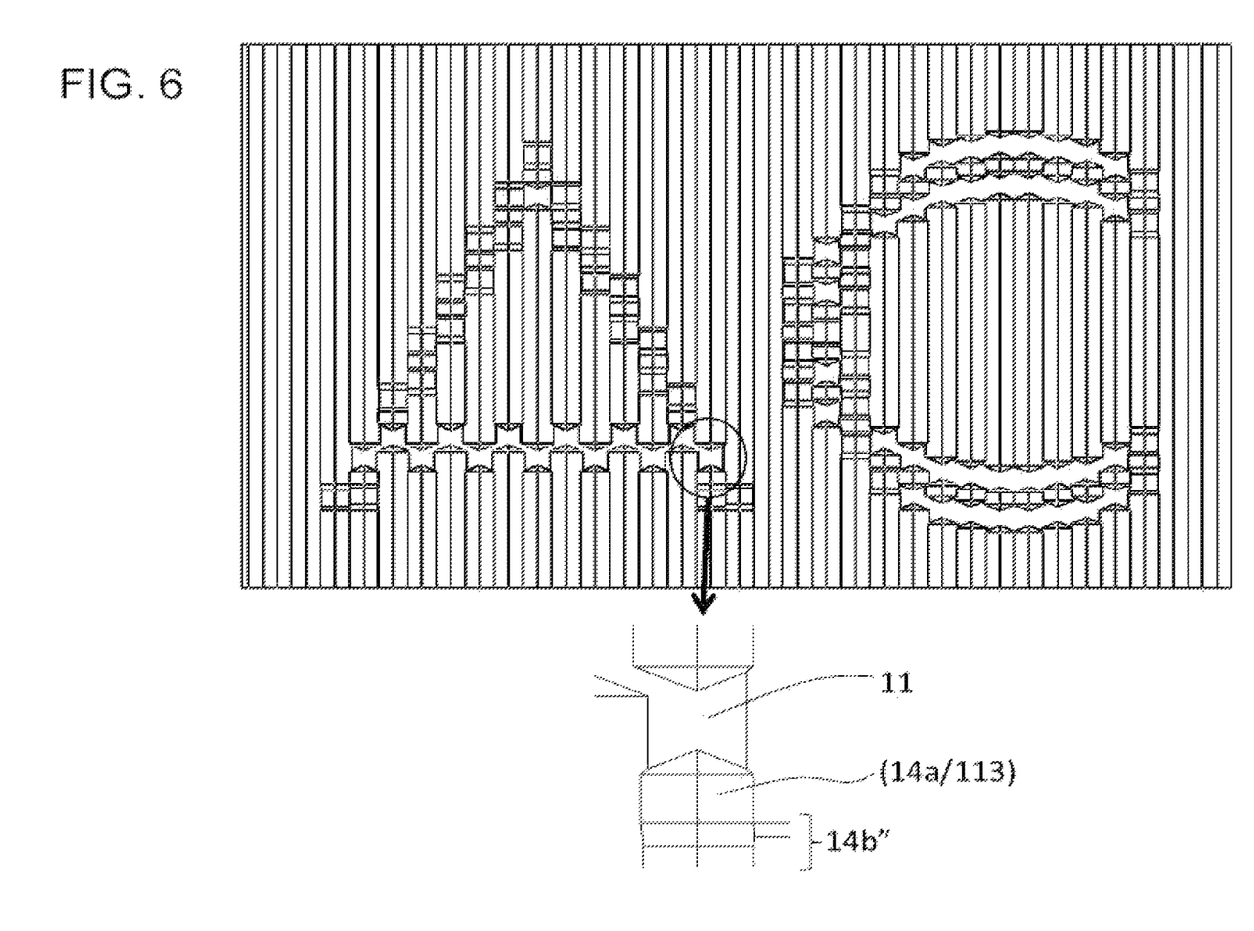
FIG. 6 is a top plan view of the article in FIG. 5.

FIGS. 5 and 6 illustrate a further embodiment of an article having patterned micro-structures representing indicia on a substrate in accordance with the present invention. In this embodiment, the structured surface 14" of the substrate 12" comprises regular prisms 14a and irregular prisms 14b" that are recessed, similar to the recessed irregular prisms 14b' in the prior embodiment. In addition, some of the regular prisms 14a and/or the irregular prisms 14b" terminates at a level coplanar with the top 11 of the base layer 12b of the substrate 12", thus forming a void within the structured surface 14" of the substrate 12". In other words, sections of the top 11 of the base layer 12b is exposed and not adhere to the bottom of the structured layer 12c" above. In this embodiment, the indicia is thus represented by irregular prisms 14b" and the exposed sections of the top surface 11 of the base layer 12b.

Furthermore, the varying prismatic structure may have irregular prisms aligned with a longitudinal axis in other than the y-direction shown in the foregoing embodiments. The longitudinal axis of the irregular prisms may be in the x-direction, z-direction, in a x-y-z direction.

Figure 7A:
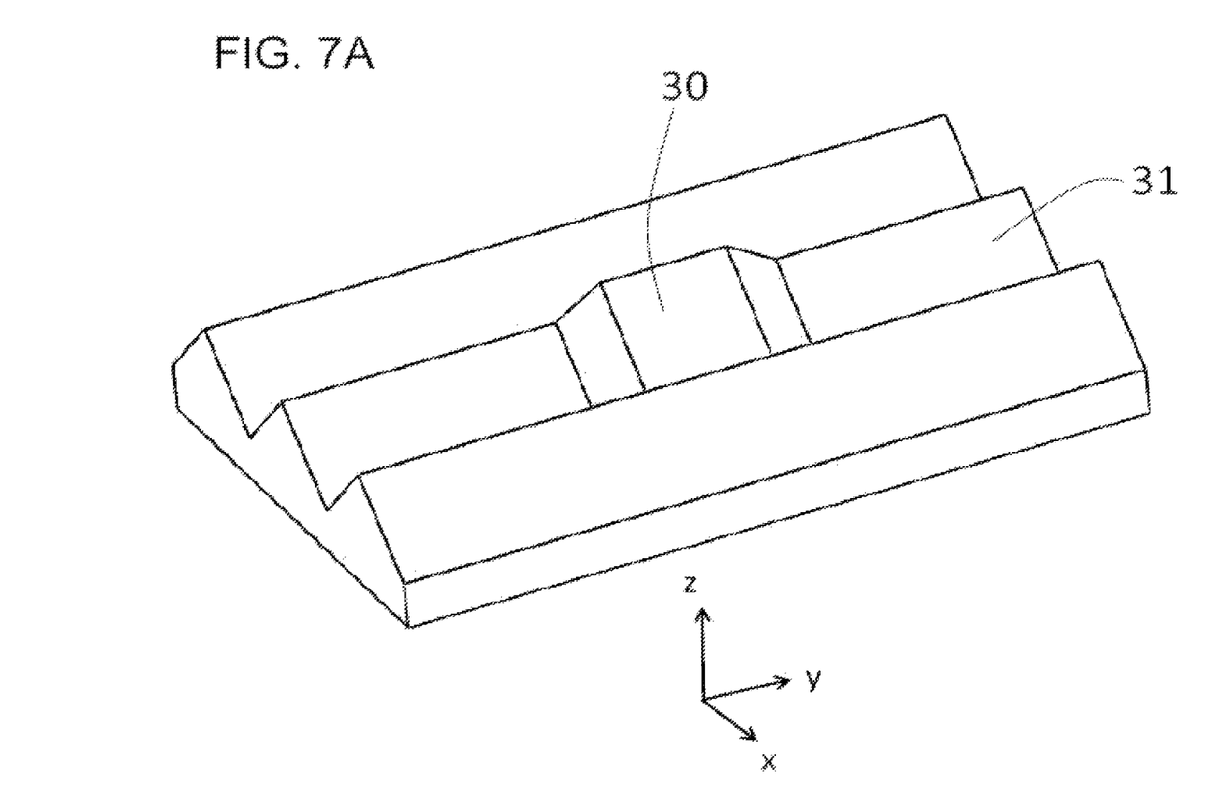
FIGS. 7A-7E are schematic perspective views of various embodiments of contrasting micro-structures between indicia and background.
Figure 7B:
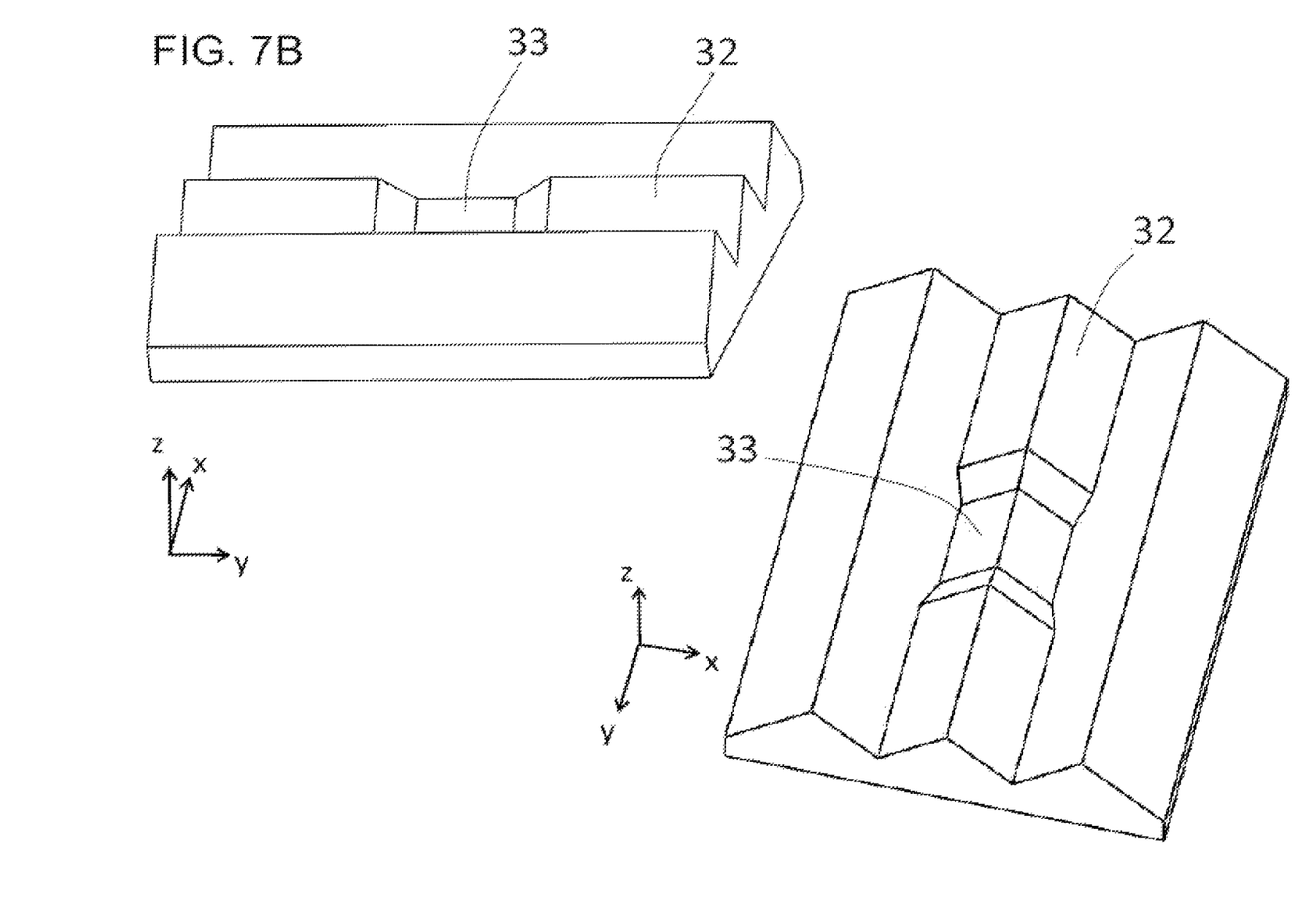
Figure 7C:
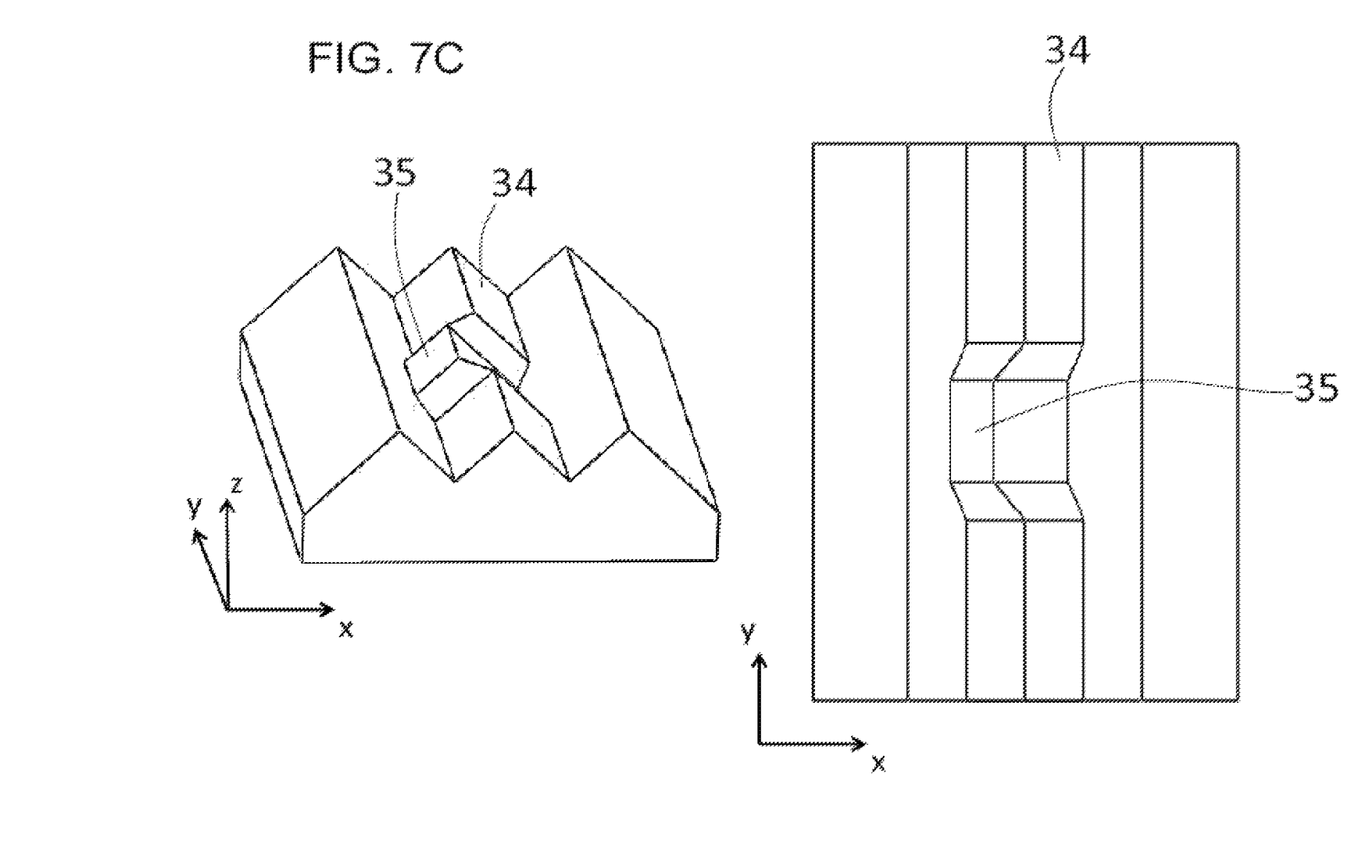
Figure 7D:
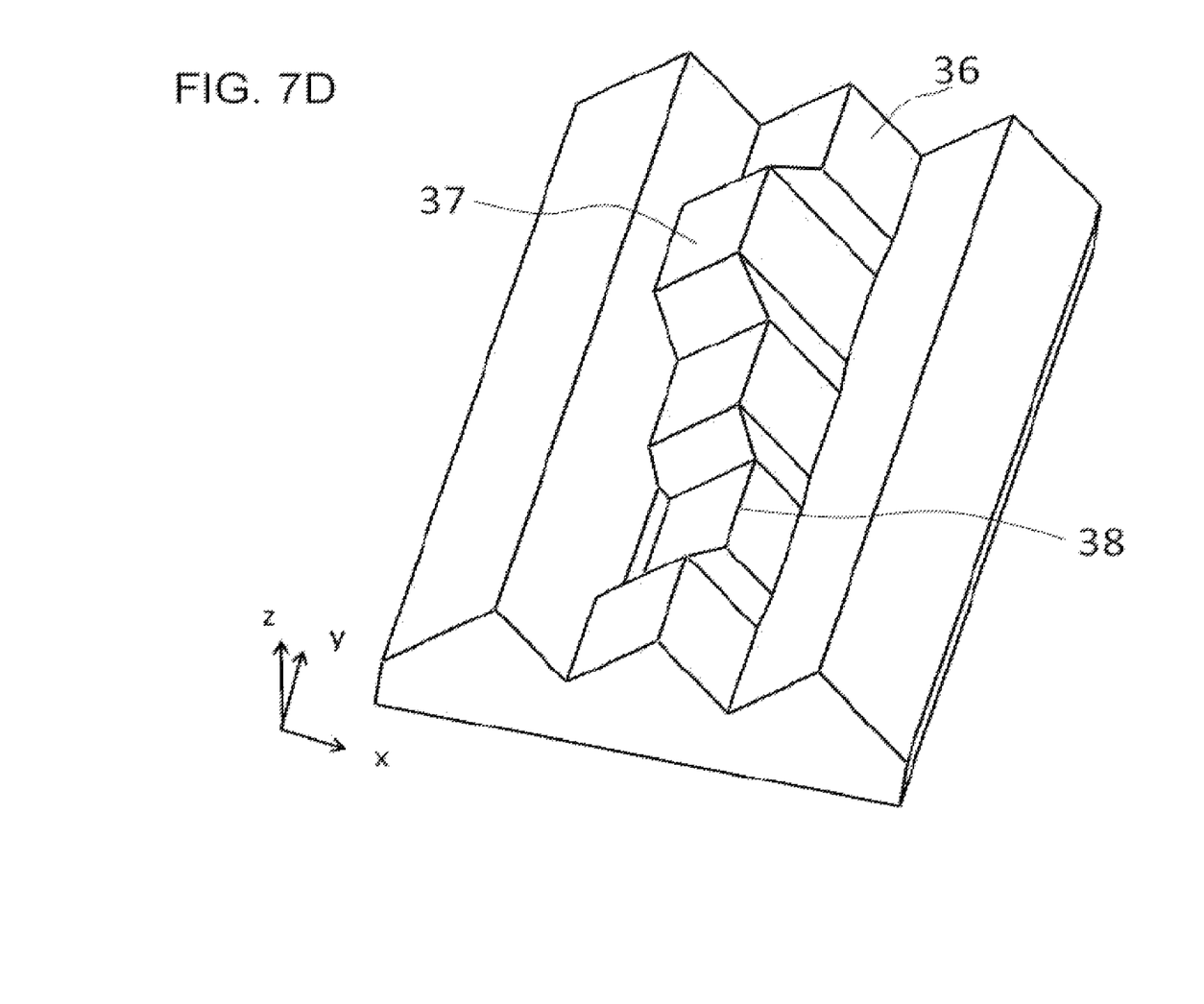
Figure 7E:
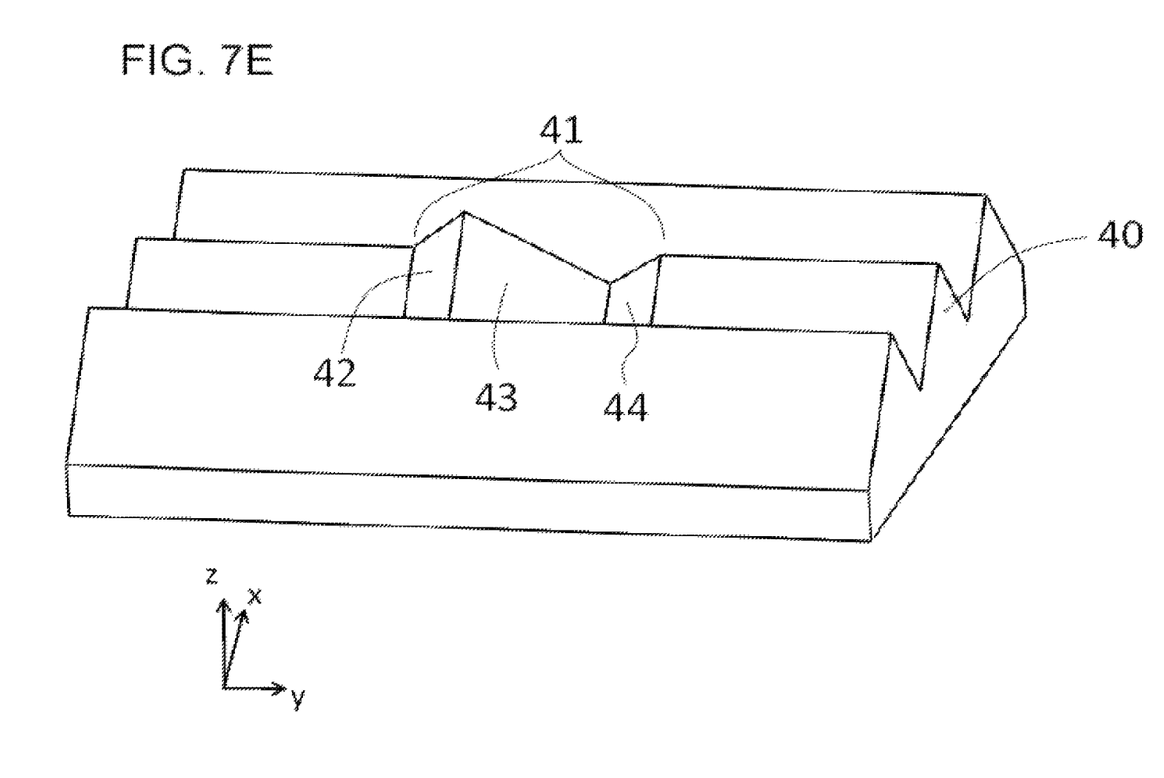

FIGS. 7A-7E further illustrates comparisons of various embodiments of contrasting micro-structures on the structure surface of the substrate. FIG. 7A shows a perspective view of a section 30 of the longitudinal regular prism 31 protrudes with rising peak height in the z-direction, similar to the embodiment show in FIG. 1. FIG. 7B shows a perspective view of a section 33 of the longitudinal regular prism 32 being recessed with reducing peak height in the z-direction, similar to the embodiment show in FIG. 3. FIG. 7C shows a perspective view of a section 35 of the longitudinal regular prism 34 with peak shifting sideways in the x-direction. FIG. 7D shows a perspective view of waving prisms, wherein sections 37 and 38 of the longitudinal regular prism 36 shifts in both x-direction and z-direction. FIG. 7E shows a perspective view of varying prisms, wherein an irregular section 41 of the longitudinal regular prism 40 is interrupted with three irregular prisms 42, 43 and 44, each comprising a tapering body. The irregular section 41 and the longitudinal regular prism 40 are all symmetrical about the y-direction in the x-y plane. The peak along this irregular section 41 varies with increasing and decreasing heights, with the peak slanting upwards and downwards and upwards.

The regular prisms 31, 32, 34, 36 and 40 share similar properties as the regular prisms 14*a* in the earlier embodiments, i.e., having a constant sectional profile (x-z plane) along the y-direction. The peak vertex angle may be right angled and the peak height (z) is constant along the y-direction.

In the various embodiments described above, the peaks of prisms (regular and irregular), and the valleys, comprises straight sections or segments (whether slanting peaks with varying peak heights or constant peak heights) and flat prism facets. It is noted that the intersections of straight prism peak segments and intersections of prism facets may not be at a sharp or well-defined corner due to manufacturing constraints (e.g., the corners may be slightly rounded). However, the prism peak segments are in large part substantially straight and the prism facets are in large part substantially flat in these embodiments. While the prism peaks have been illustrated to comprise straight peak segments and flat prism facets, the peaks of the micro-structures may have wavy peak segments (e.g., sinusoidal, regularly varying, or random varying, etc.) and the facets of the micro-structures may not be substantially flat (e.g., wavy), without departing from the scope and spirit of the present invention, as long as the structures of the micro-structures representing the indicia are contrast to the structures of the micro-tructures on background surface, as illustrated above.

The height difference (in z direction) or/and the extent of lateral meandering (snaking in the x-y plane, in y-direction) between the micro-structures in the indicia and the background micro-structures maybe a constant or varied in a random manner.

In an alternate embodiment (not shown), the background prismatic structure includes a random distribution of irregular prisms with random structures (i.e., at white noise randomness level), and indicia represented by patterned micro-structural features or topography that are contrasted and recognizable against the plane of the irregular prisms.

While the article 10 is made by using transparent material, the level of transparency of the indicia on the article 10 would be affected by the height and/or sideways waving difference for variations between the irregular and regular prisms. Variations with constant difference have clearer or more transparent image than variations with random differences, thereby creating different optical effects, namely different perceivable gray scale levels from the variations in transparency, variations in reflectivity from the base layer of the substrate due to variations in micro-structures in the top layer, and/or variations in refractivity of the structured layer. Therefore, indicia with various grey scales for many different applications, such as anti-counterfeit note, security recognition, special labels or marks may be achieved. Further, the indicia may be in the form of a design pattern directly applied to the exterior body of products. For example, the micro-structured layer may be applied to a fabric base layer, wherein the micro-structured layer includes an array of indicia that contrast from a uniform, orderly background. The indicia may have a pattern that is desirable to enhance the value of the products to consumers in addition to providing authentication (e.g., an array of "VL" logos on the exterior of handbags, to designate products from the Virtual Losers, Inc., or an array of "ROLAX" words on the watch faces to authenticate watches from the Cheap Watch Company.

The structured surface of article of the present invention may be generated in accordance with a number of process techniques, including micromachining using hard tools to form molds or the like for the irregular prismatic profile described above. The hard tools may be very small diamond tools mounted on CNC (Computer Numeric Control) machines (e.g. turning, milling and ruling/shaping machines). Preferably these machines may add some vibration or perturbation generating devices to assist the tools moving with small shifts and making prisms with different level of irregularity. Known STS (Slow Tool Servo), FTS (Fast Tool Servo) and some ultrasonic vibration apparatus are examplary devices. U.S. Pat. No. 6,581,286, for instance, discloses one of the applications of the FTS for making grooves on an optical film by using thread cutting method. The tool is mounted onto the machine, to create constant peak vertex angle in relation to x-z planes along the y direction within a prism. By using the devices to form surfaces in the mold in relation to increasing degrees of freedom, three-dimensionally varying irregular prism blocks of the structured surfaces of the optical article disclosed above can be obtained.

The master may be used to mold the optical article directly or used in electroforming a duplicate of the master, which duplicate is used to mold the optical article. The mold may be in the form of a belt, a drum, a plate, or a cavity. The mold may be used to form the prismatic structure on a substrate through hot embossing of the article, and/or through the addition of an ultraviolet curing or thermal setting materials in which the structures are formed. The mold may be used to form the optical article through injection molding. The substrate or coating material may be any organic, inorganic or hybrid optically transparent material and may include suspended diffusion, bi-refringent or index of refraction modifying particles.

Further discussions of processes for forming a substrate having structured surfaces may be referenced to U.S. Pat. No. 7,618,164, which had been incorporated by reference herein.

It will be apparent to those skilled in the art that various modifications and variations can be made to the disclosed structures and processes of the present invention without departing from the scope or spirit of the invention. In view of the foregoing descriptions, it is intended that the present invention covers modifications and variations of this invention if they fall within the scope of the following claims and their equivalents.

What is claimed is:

1. An article having a micro-structured surface, comprising:
   a substrate having a first surface and a second surface;
   a pattern of first micro-structures on the first surface; and
   a pattern of second micro-structures provided on the first surface which forms a background for the first pattern of first micro-structures,
   wherein at least one of the pattern of first micro-structures and the pattern of second micro-structures comprises prismatic structures, wherein the pattern of first micro-structures represents a two-dimensional indicia that is perceivable as a recognizable two-dimensional pattern in reference to the pattern of second micro-structures as the background, and wherein the pattern of first micro-structures contrast from the background, wherein the first micro-structures and the second micro-structures are aligned along generally a same longitudinal direction, wherein at least some of the first micro-structures are connected end-to-end to respective second micro-structures longitudinally, and wherein the end-to-end connected first micro-structures and second micro-structures define transitions that are perceivable to define a boundary of the two-dimensional indicia represented by the pattern of first micro-structures in reference to the pattern of micro-structures as the background.

2. An article as in claim 1, wherein the pattern of first micro-structures comprises first prismatic structures that contrast the pattern of first micro-structures from the background.

3. An article as in claim 2, wherein the first prismatic structures comprise irregular prisms.

4. An article as in claim 2, wherein the second micro-structures comprise second prismatic structures that form a uniform background.

5. An article as in claim 4, wherein the first prismatic structures include raised or recessed structures with respect to the surfaces of the second prismatic structures.

6. An article as in claim 4, wherein the second prismatic structures comprise regular prisms that form a uniform background.

7. An article as in claim 6, wherein the first prismatic structures comprise irregular prisms.

8. An article as in claim 7, wherein the regular prisms comprise rows of longitudinal prisms.

9. An article as in claim 8, wherein the irregular prisms include raised or recessed structures with respect to the regular prisms.

10. An article as in claim 1, wherein substrate includes a structured surface layer having the first surface and a base layer having the second surface.

11. An article as in claim 10, wherein indicia includes exposed top surface of the base layer.

12. An article as in claim 1, wherein the second micro-structures comprise uniform cylindrical structures in a longitudinal direction having a constant sectional profile.

13. An article as in claim 12, wherein the uniform cylindrical structures comprises prismatic structures that include a plurality of regular prisms arranged in longitudinal rows, or lenticular structures.

14. An article as in claim 1, wherein the article is a label or seal.

15. An anti-counterfeiting label, comprising an article as in claim 1.

16. A method of authentication of an object, comprising providing an article as in claim 1, wherein the indicia corresponds to authenticity of the object.

17. An article having a micro-structured surface, comprising:
   a substrate having a first surface and a second surface opposing the first surface;
   a pattern of first micro-structures on the first surface; and
   a pattern of second micro-structures on the first surface, which forms a background for the pattern of first micro-structures;
   a pattern of third micro-structures formed on the second surface of the substrate,
   wherein at least one of the pattern of first micro-structures and the pattern of second micro-structures comprises prismatic structures, wherein the pattern of first micro-structures represents a two-dimensional indicia that is perceivable as a recognizable two-dimensional pattern in reference to the pattern of second micro-structures as the background, and wherein the pattern of first micro-structures contrast from the background.

18. An article as in claim 17, wherein the first micro-structures and the second micro-structures are aligned along generally a same longitudinal direction, wherein at least some of the first micro-structures are connected end-to-end to respective second micro-structures longitudinally, and wherein the end-to-end connected first micro-structures and second micro-structures define transitions that are perceivable to define a boundary of the two-dimensional indicia represented by the pattern of second micro-structures in reference to the pattern of first micro-structures as the background.

19. An article having a micro-structured surface, comprising:
   a substrate having a first surface and a second surface;
   a pattern of first micro-structures on the first surface; and
   a pattern of second micro-structures on the first surface, which forms a background for the pattern of first micro-structures;
   a pattern of third micro-structures formed on the second surface of the substrate, wherein the pattern of third micro-structures and the pattern of first micro-structures together represent a two dimensional indicia that is perceivable as a recognizable two-dimensional pattern in reference to the second micro-structures as background.

20. An article as in claim 19, wherein a third prismatic structure is disposed on the second surface of the substrate.

* * * * *

UNITED STATES PATENT AND TRADEMARK OFFICE
CERTIFICATE OF CORRECTION

PATENT NO. : 8,595,964 B2
APPLICATION NO. : 12/832021
DATED : December 3, 2013
INVENTOR(S) : Kong-Hua Wang et al.

Page 1 of 1

It is certified that error appears in the above-identified patent and that said Letters Patent is hereby corrected as shown below:

In the Specifications:

Column 9, line 32, "micro-tructures" should be changed to --micro-structures--.

In the Claims:

Column 10, Claim 1, line 63, "and wherein" should be changed to --wherein--.

Column 11, Claim 1, line 7, "pattern of micro-structures" should be changed to --pattern of second microstructures--.

Column 12, Claim 18, lines 28-30, "the pattern of second micro-structures in reference to the pattern of first micro-structures as the background" should be changed to --the pattern of first micro-structures in reference to the pattern of second micro-structures as the background--.

Signed and Sealed this
Eleventh Day of February, 2014

Michelle K. Lee
*Deputy Director of the United States Patent and Trademark Office*